United States Patent Office 3,022,358
Patented Feb. 20, 1962

3,022,358
PREPARATION OF ORGANIC DIHALIDES
Edward L. Jenner, Wilmington, Del., assignor to E. I. du Pont de Nemours and Company, Wilmington, Del., a corporation of Delaware
No Drawing. Filed Oct. 7, 1953, Ser. No. 384,767
12 Claims. (Cl. 260—654)

This invention relates to the preparation of polyhalogenated organic compounds. More particularly, it relates to the preparation of organic dihalides from ethylenically unsaturated polymerizable organic compounds.

Polyhalogenated organic compounds have achieved considerable importance as solvents for various materials and as intermediates for the preparation of dinitriles, dibasic acids, diamides and diamines which in turn can be converted to polymers having highly desirable fiber-forming characteristics.

Polyhalogenated organic compounds have heretofore been produced by the direct halogenation of organic compounds, particularly hydrocarbons. Such halogenation usually results in the production of compounds wherein the halogens are adjacent to, or take the place of, functional groups in the organic compound. Such halogenation involves the use of halogen molecules as a starting material.

It is an object of this invention to produce polyhalogenated organic compounds, particularly dihalides, by the reaction of ethylenically unsaturated polymerizable organic compounds of at least three carbon atoms with halogen atoms.

It is another object of this invention to react ethylenically unsaturated polymerizable organic compounds with halogen atoms to produce dihalogenated organic compounds having the formula XMMX wherein X is chlorine or bromine and M is the unit of the polymerizable ethylenically unsaturated compound.

It is a further object of this invention to produce certain new organic dihalides.

Other objects of the invention will appear hereinafter.

The objects of this invention may be effected by mixing a conjugated ethylenically unsaturated polymerizable organic compound of from three to eight carbon atoms with an aqueous solution of an inorganic chloride or bromide and an oxidizing agent of sufficient strength to oxidize the halide ion to halogen atom. With 1,3-butadiene as the ethylenically unsaturated compound, new 1,8-dihalooctadienes are obtained.

The following illustrative examples set forth in specific detail several preferred embodiments of the invention.

Example I

A reaction vessel was charged with 103 parts of sodium bromide, 1500 parts of water, 780 parts of tert.-butyl alcohol and 8 parts of 1,3-butadiene. To this vigorously stirred mixture there was introduced simultaneously and equivalently the following three reactants: (1) a solution of 34 parts of hydrogen peroxide in 130 parts of water; (2) a solution of 278 parts of ferrous sulfate heptahydrate and 98 parts of sulfuric acid in 575 parts of water; and (3) 108 parts of 1,3-butadiene. The reaction mixture was maintained at a temperature of 5° C. during the thirteen minutes required for the addition of the reactants. The reaction mixture was then extracted three times with ether (500 parts were used for each extraction). The combined ethereal extracts were dried over anhydrous magnesium sulfate and were then subjected to distillation. After the ether and tert.-butyl alcohol had distilled, the following fractions were obtained:

| Fraction No. | Weight, parts | Boiling Point | $n_D^{25}$ |
|---|---|---|---|
| I | 22.0 | 35–60° C./2 mm | 1.4671 |
| II | 10.5 | 62–82° C./2 mm | 1.5270 |
| III | 3.5 | 100–105° C./2 mm | 1.5159 |
| R | 21.0 | (Residue) | |

Fraction II is principally dibromooctadiene.
Analysis.—Calc'd. for $C_8H_{12}Br_2$: C, 35.85; H, 4.51; Br, 59.64; Mol. Wt., 268. Found: C, 34.61; H, 4.82; Br, 58.11; Mol. Wt., 246.

Example II

A reaction vessel was initially charged with 234 parts of sodium chloride, 2000 parts of water, 390 parts of tert.-butyl alcohol, and 8 parts of 1,3-butadiene. To this mixture were added simultaneously and equivalently: (1) 278 parts of ferrous sulfate heptahydrate and 98 parts of sulfuric acid in 575 parts of water, (2) 34 parts of hydrogen peroxide in 130 parts of water, and (3) 108 parts of 1,3-butadiene. During the fourteen minutes required for the addition, the mixture was maintained at a temperature of 0° C. The product was isolated by extracting the mixture three times with ether and drying the combined ether extract over magnesium sulfate. The following fractions were obtained after the ether and tert.-butyl alcohol had distilled:

| Fraction No. | Quantity, parts | Boiling Point | $n_D^{25}$ |
|---|---|---|---|
| I | 31 | 31–32° C./11 mm | 1.4025 |
| II | 10 | 34–36° C./11 mm | 1.4438 |
| III | 6 | 44–62° C./1 mm | 1.4798 |
| IV | 6 | 63–72° C./1 mm | 1.4828 |
| R | 6 | (Residue) | |

Fraction III contains dichlorooctadiene.
Analysis.—Calc'd. for $C_8H_{12}Cl_2$, C, 53.65; H, 6.75; Cl, 39.60. Found: C, 53.25; H, 7.61; Cl, 33.47.

Example III

A reaction vessel was charged with 103 parts of sodium bromide, 1000 parts of water, 1170 parts of tert.-butyl alcohol, and 8 parts of 1,3-butadiene. To this vigorously agitated mixture two reactants were added simultaneously and equivalently over a fifteen-minute period: (1) 108 parts of 1,3-butadiene, and (2) a solution of 269 parts of ceric perchlorate, and 603 parts of perchloric acid in 640 parts of water. The mixture was maintained at 0° C. throughout the addition. The mixture was extracted three times with ether, and the extracts were dried over magnesium sulfate. After the distillation of the ether and tert.-butyl alcohol, the following fractions were obtained:

| Fraction No. | Quantity, parts | Boiling Point | $n_D^{25}$ |
|---|---|---|---|
| I | 3.2 | 28–52° C./3 mm | 1.5119 |
| II | 12.1 | 52–88° C./2 mm | 1.5435 |
| III | 7.1 | 90–122° C./ca. 2 mm | 1.5415 |
| R | 0.7 | (Residue) | |

Fraction II is dibromooctadiene containing some dibromobutene as indicated by its high bromine content.
Fraction III is substantially pure dibromooctadiene.

*Analysis.*—Calc'd. for $C_8H_{12}Br_2$: C, 35.85; H, 4.51; Br, 59.64; Mol. Wt., 268. Found—For Fraction II: C, 30.86; H, 4.01; Br, 64.10. For Fraction III: C, 35.01; H, 4.47; Br, 60.72; Mol. Wt., 272.

Example IV

A reaction vessel was charged with 116 parts of sodium chloride, 1500 parts of water, and 780 parts of tert.-butyl alcohol. To this vigorously agitated mixture maintained at a temperature of 65° C. there were added simultaneously and equivalently: (1) 108 parts of 1,3-butadiene, and (2) a solution of 135 parts of ceric perchlorate, and 301 parts of perchloric acid in 320 parts of water. Twelve (12) minutes were required for the addition. The mixture was poured onto 2000 parts of ice, and the resulting mixture was extracted three times with ether. The combined ether extracts were dried first over anhydrous sodium sulfate and then over anhydrous magnesium sulfate. The ether and tert.-butyl alcohol were distilled, and the crude product was combined with that obtained from another identical experiment. The crude product totalled 5.2 parts, of this 4.2 parts were distilled:

| Fraction No. | Quantity, parts | Boiling Point |
| --- | --- | --- |
| I | 0.6 | 39–59° C./1 mm. |
| II | 1.8 | 61–75° C./1 mm. |
| III | 0.2 | 76–77° C./1 mm. |
| R | 1.6 | (Still residue.) |

Fraction II is dichlorooctadiene.

*Analysis.*—Calc'd. for $C_8H_{12}Cl_2$: C, 53.65; H, 6.75; Cl, 39.60. Found: C, 54.67; H, 7.27; Cl, 37.27.

Example V

A reaction vessel was charged with 1014 parts of 47% hydrobromic acid, 750 parts of water, and 580 parts of tert.-butyl alcohol. This mixture was agitated vigorously at a temperature of 1–4° C., and a small stream of 1,3-butadiene was passed in for several minutes. To this was added over a period of forty minutes, 420 parts of 63% ceric hydrogen sulfate $(Ce(HSO_4)_4)$ dissolved in 1000 parts of water. After this addition, the reaction mixture was stirred for another twenty minutes and then filtered. The solid was extracted with chloroform, and the oil remaining after the chloroform was evaporated was added to the bottom layer of filtrate. The 61.6 parts of crude product was distilled, giving 9.88 parts of dibromobutene fractions corresponding to 18.2% yield and 30.62 parts of dibromooctadiene fractions corresponding to 45.8% yield.

Fractional distillation of the dibromooctadiene fractions yielded three separate products. The first had a boiling point of 58° C. at 0.04 mm. and infrared analysis showed the unsaturation to be primarily terminal, corresponding to the structure

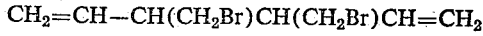
$$CH_2=CH-CH(CH_2Br)CH(CH_2Br)CH=CH_2$$

The second fraction boiled at 70° C. at 0.05 mm. and infrared showed both terminal and internal unsaturation corresponding to the structure

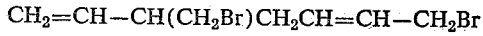
$$CH_2=CH-CH(CH_2Br)CH_2CH=CH-CH_2Br$$

The third fraction boiled at 85° C. at 0.08 mm. and consisted of the internally unsaturated 1,8-dibromo-2,6-octadiene.

The above examples are merely illustrative and the invention is broadly applicable to the preparation of dihalides from polymerizable ethylenically unsaturated conjugated compounds, such as acrylonitrile, styrene, and methyl methacrylate. The monomers which contain at least three and preferably not more than eight carbon atoms will generally be used. However, the preferred polymerizable compounds are those that contain conjugated unsaturation and of these the compounds which have two conjugated ethylenic groups are particularly suitable as they react readily and yield dihalides containing two isolated unsaturated linkages. The readily available and particularly preferred conjugated dienes are those of four to six carbon atoms, inclusive. These include 1,3-butadiene, isoprene, 2-chloro-1,3-butadiene, 2-fluoro-1,3-butadiene, 1,3-cyclopentadiene, and 1,3-cyclohexadiene. Of these, the hydrocarbon dienes of four and five carbons are preferred.

The inorganic halide employed is water-soluble, and the halogen exists as halide ion in water solution. The halides particularly included are the chlorides and bromides, i.e., halogens of atomic number of 17 to 35. The halides are generally introduced as the hydrogen halide or as an inorganic salt, and generally of groups I and II alkali or alkaline earth metals. For reasons of availability, the alkali metal and particularly the sodium chlorides and bromides are preferred. Salts that can be used as sources of the halide ion in water solution include potassium chloride, potassium bromide, calcium chloride, and magnesium bromide.

The reaction of this invention requires the use of a relatively strong oxidizing agent, in conjunction with the halide ion, which will oxidize the halide ion to a halogen atom. The oxidizing agent should be water soluble. Suitable oxidizing agents include hydrogen peroxide-ferrous ion in substantially molar combinations, ceric salts such as ceric sulfate, cobaltic salts such as cobaltic sulfate or chloride, and bromates such as sodium and potassium bromate. The oxidizing agent is employed to react with the halide ion in equivalent amounts. The molar ratio of oxidizing agent to halide ion is generally less than one since the halogen compound is cheap and readily available. However, during the reaction, no more halide is involved than is equivalent to the oxidizing agent introduced. Molar ratios of oxidizing agent to halide ion generally vary from 0.2:1 to 1:1.

A particularly preferred oxidizing system is one which produces hydroxyl radical. A test for the presence of hydroxyl radicals has been described by Stein and Weiss in "Nature" 166, 1104–5 (1950). The hydroxyl radical is conveniently obtained by the action of a reducing agent on hydrogen peroxide or on a suitable inorganic peroxide in substantially equivalent amounts. Ferrous ion is particularly preferred as a reducing agent, and ferrous sulfate with hydrogen peroxide is suitable for the production of hydroxyl radicals.

The reaction of this invention is effected in aqueous medium. The preferred amount of water present in the reaction mixture will be about 10–25 times as much as the weight of the ethylenically unsaturated compound employed. Smaller or larger quantities can be used, e.g., 2–100 times as much as the unsaturated compound. Large quantities of water may result in inconvenience in the isolation of the organic dihalide.

To achieve solubility of the less water-soluble unsaturates in the reaction medium, a relatively inert solvent, for example, tert.-butyl alcohol, can be added.

The aqueous reaction mixture should be maintained under conditions whereby high concentrations of alkali are avoided. When a reducing agent such as ferrous sulfate is employed with hydrogen peroxide, a suitable mineral acid, such as sulfuric acid, is employed to have a homogeneous system. The pH of such reaction systems is preferably less than 7 and may be less than 2; higher pH values can, however, be used.

The reaction time is not critical but generally ten to fifteen minutes is required for the addition of oxidizing agent, or the simultaneous formation and addition of oxidizing agent. Preferably, the reaction is carried out at a temperature of less than 100° C. and generally between −10° C. and 75° C., with a temperature of less than 25° C. being usually more beneficial than higher values.

The products obtained are isolated by suitable means.

The products are generally water insoluble and can be obtained by extraction and distillation. The products are halides of the general formula X—M—M—X wherein X is Cl or Br, and M is the unit of the polymerizable ethylenically unsaturated compound.

The process of this invention provides a method for the preparation of certain new compounds. The new products obtained by the reaction of 1,3-butadiene with a chloride ion in the presence of an oxidizing agent that will convert the chloride ion to a chlorine atom are of particular utility in the preparation of alpha,omega-dinitriles and the corresponding acids and amines therefrom which are of importance in the preparation of condensation polymers suitable for the formation of commercially useful fibers, e.g., of nylon. The new dihalides are the 1,8-dihalooctadienes having the formula

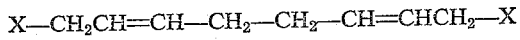
X—CH$_2$CH=CH—CH$_2$—CH$_2$—CH=CHCH$_2$—X wherein X is a halogen of atomic number of 17 to 35, i.e., chlorine or bromine. These compounds contain two nonconjugated ethylenic bonds which are available for addition reactions. Such double bonds are useful in the production of insoluble polymers by vulcanization procedures performed on polymers containing these structures.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The process for the preparation of organic dihalides which comprises mixing, at a temperature below 100° C. and a pH of less than 7, a polymerizable organic compound having conjugated unsaturation and three to eight carbon atoms with an aqueous solution of an ionizable inorganic halide from the group consisting of chlorides and bromides and an oxidizing agent taken from the group consisting of hydroxyl radicals and ceric ions.

2. The process for the preparation of organic dihalides which comprises mixing, at a temperature below 100° C. and a pH of less than 7, a conjugated diene of four to six carbon atoms with an aqueous solution of an ionizable inorganic halide from the group consisting of chlorides and bromides and an oxidizing agent taken from the group consisting of hydroxyl radicals and ceric ions.

3. The process for the preparation of organic dihalides which comprises mixing, at a temperature below 100° C. and a pH of less than 7, 1,3-butadiene with an aqueous solution of an ionizable inorganic halide from the group consisting of chlorides and bromides and an oxidizing agent taken from the group consisting of hydroxyl radicals and ceric ions.

4. The process for the preparation of organic dihalides which comprises mixing, at a temperature between —10° C. and 25° C. and a pH of less than 7, a polymerizable organic compound having conjugated unsaturation and three to eight carbon atoms with an aqueous solution of an ionizable inorganic halide from the group consisting of chlorides and bromides and an oxidizing agent taken from the group consisting of hydroxyl radicals and ceric ions.

5. The process for the preparation of organic dihalides which comprises mixing, at a temperature between —10° C. and 25° C. and a pH of less than 7, a conjugated diene of four to six carbon atoms with an aqueous solution of an ionizable inorganic halide from the group consisting of chlorides and bromides and an oxidizing agent taken from the group consisting of hydroxyl radicals and ceric ions.

6. The process for the preparation of organic dihalides which comprises mixing, at a temperature between —10° C. and 25° C. and a pH of less than 7, 1,3-butadiene with an aqueous solution of an ionizable inorganic halide from the group consisting of chlorides and bromides and an oxidizing agent taken from the group consisting of hydroxyl radicals and ceric ions.

7. The process for the preparation of organic dihalides which comprises mixing, at a temperature between —10° C. and 25° C. and a pH of less than 7, a polymerizable organic compound having conjugated unsaturation and three to eight carbon atoms with an aqueous solution of an ionizable inorganic halide from the group consisting of chlorides and bromides and an oxidizing agent taken from the group consisting of hydroxyl radicals and ceric ions with a molar ratio of oxidizing agent to halide ion between 0.2–1 and 1–1.

8. The process for the preparation of organic dihalides which comprises mixing, at a temperature between —10° C. and 25° C. and a pH of less than 7, a conjugated diene of four to six carbon atoms with an aqueous solution of an ionizable inorganic halide from the group consisting of chlorides and bromides and an oxidizing agent taken from the group consisting of hydroxyl radicals and ceric ions with a molar ratio of oxidizing agent to halide ion between 0.2–1 and 1–1.

9. The process for the preparation of organic dihalides which comprises mixing, at a temperature below 100° C. and a pH of less than 7, a polymerizable organic compound having conjugated unsaturation and three to eight carbon atoms with an aqueous solution of an ionizable inorganic halide from the group consisting of chlorides and bromides, and hydroxyl radicals as an oxidizing agent.

10. The process for the preparation of organic dihalides which comprises mixing, at a temperature below 100° C. and a pH of less than 7, a polymerizable organic compound having conjugated unsaturation and three to eight carbon atoms with an aqeuous solution of an ionizable inorganic halide from the group consisting of chlorides and bromides, and ceric ions as an oxidizing agent.

11. A process which comprises reacting a conjugated diene in the presence of a free radical that will convert a halide ion to a halogen atom, chloride anions and tertiary butyl alcohol is a solubilizing solvent for said diene whereby to produce a reaction mixture comprising a product corresponding to addition of two chlorine atoms to a dimer of said diene.

12. A process which comprises reacting an aliphatic conjugated diene in the presence of a free radical that will convert a halide ion to a halogen atom, chloride anions and tertiary butyl alcohol is a solubilizing solvent for said diene whereby to produce a reaction mixture containing a dichloro compound corresponding to addition of two chlorine atoms to two units of the diene, said reaction being carried out in liquid phase.

References Cited in the file of this patent

UNITED STATES PATENTS 2,832,809     Frank _____ Apr. 29, 1958

FOREIGN PATENTS 430,539     Germany _____ June 23, 1926

OTHER REFERENCES

Jour. Gen. Chem. U.S.S.R. (translation), vol. 22, No. 1, pages 123–126, Jan. 1952.

Bellstein: "Handbuch der Organische Chemie," vol. 1, second supplement, page 236,